United States Patent
Wittenbrink et al.

(10) Patent No.: US 6,555,725 B1
(45) Date of Patent: Apr. 29, 2003

(54) IN-SITU HYDROISOMERIZATION OF SYNTHESIZED HYDROCARBON LIQUID IN A SLURRY FISCHER-TROPSCH REACTOR

(75) Inventors: Robert Jay Wittenbrink, Kingwood, TX (US); Charles John Mart, Baton Rouge, LA (US); Janet Renee Clark, Baton Rouge, LA (US); Jennifer Schaefer Feeley, Lebanon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/992,372

(22) Filed: Nov. 6, 2001

(51) Int. Cl.[7] ............................. C07C 5/13; C07C 1/00
(52) U.S. Cl. ...................... 585/734; 585/300; 585/733
(58) Field of Search .................. 585/300, 733, 585/734

(56) References Cited

U.S. PATENT DOCUMENTS 5,962,537 A * 10/1999 Leviness ..................... 518/700

* cited by examiner

Primary Examiner—Thuan D. Dang
(74) Attorney, Agent, or Firm—Mark D. Marin

(57) ABSTRACT

A slurry Fischer-Tropsch hydrocarbon synthesis process for synthesizing liquid hydrocarbons from synthesis gas in a hydrocarbon synthesis reactor also hydroisomerizes the synthesized hydrocarbon liquid, which comprises the slurry liquid, in one or more downcomer reactors immersed in the slurry body in the synthesis reactor. A monolithic catalyst is preferably used for the hydroisomerization, and slurry circulation down through the downcomer reactors from the surrounding slurry body, is achieved at least in part by density-difference driven hydraulics created by removing gas bubbles from the slurry passed into the downcomers. Preferably, catalyst particles are also removed before the slurry contacts the catalyst. Hydroisomerization occurs while the synthesis reactor is producing hydrocarbons, without interfering with the hydrocarbon synthesis reaction.

25 Claims, 3 Drawing Sheets

IN-SITU HYDROISOMERIZATION OF SYNTHESIZED HYDROCARBON LIQUID IN A SLURRY FISCHER-TROPSCH REACTOR

BACKGROUND OF THE DISCLOSURE

1. Field of the Invention

The invention relates to a slurry hydrocarbon synthesis process with hydrocarbon hydroisomerization in the synthesis reactor. More particularly the invention relates to a slurry Fischer-Tropsch hydrocarbon synthesis process, wherein the synthesized hydrocarbon slurry liquid is hydroisomerized in the synthesis reactor by circulating it down through a downcomer reactor in the synthesis slurry, in which the liquid reacts with hydrogen in the presence of a monolithic hydroisomerization catalyst.

2. Background of the Invention

The slurry Fischer-Tropsch hydrocarbon synthesis process is now well known and documented, both in patents and in the technical literature. This process comprises passing a synthesis gas, which comprises a mixture of $H_2$ and CO, up into a hot reactive slurry in a hydrocarbon synthesis reactor, in which the slurry comprises synthesized hydrocarbons which are liquid at the synthesis reaction conditions and in which is dispersed a particulate Fischer-Tropsch type of catalyst. The $H_2$ and CO react in the presence of the catalyst and form hydrocarbons. The hydrocarbon liquid is continuously or intermittently withdrawn from the synthesis reactor and pipelined to one or more downstream upgrading operations. The upgraded products may include, for example, a syncrude, various fuels and lubricating oil fractions and wax. The downstream upgrading includes fractionation and conversion operations, typically comprising hydroisomerization, in which a portion of the molecular structure of at least some the hydrocarbon molecules is changed. It would be an improvement if the synthesized hydrocarbon slurry liquid could be at least partially hydroisomerized to reduce its pour and melt points within the synthesis reactor and without the need for a separate hydroisomerization facility, to make it more transportable by pipeline, before it is transferred to downstream operations.

SUMMARY OF THE INVENTION

The invention relates to a slurry Fischer-Tropsch hydrocarbon synthesis process in which the synthesized hydrocarbon slurry liquid is hydroisomerized in the synthesis reactor by circulating it down through one or more downcomer reactors in the synthesis slurry, in which the liquid reacts with hydrogen in the presence of a hydroisomerization catalyst and preferably a monolithic hydroisomerization catalyst, to hydroisomerize the liquid which is then passed back into the slurry body in the synthesis reactor. The slurry liquid, which comprises synthesized hydrocarbons that are liquid at the synthesis reaction conditions, comprises mostly normal paraffins and the hydroisomerization reduces its pour and melt points, thereby making it more pumpable and pipelinable. By downcomer reactor is meant a downcomer containing the hydroisomerization catalyst in its interior and that circulation of slurry from the slurry body down through the downcomer reactor is produced all or mostly by density-difference hydraulics, in which the density of the slurry flowing down through the downcomer reactor is greater than the surrounding slurry body in the synthesis reactor. Slurry densification is achieved by removing at least a portion of the gas bubbles from the slurry, thereby densifying it before it passes down the downcomer reactor. The one or more downcomer reactors may each comprise a simple, substantially vertical, hollow fluid conduit or pipe open at its top and bottom and are immersed in the slurry body in the synthesis reactor. Except for the absence of a hydroisomerization catalyst and means for injecting a hydrogen treat gas into its interior, the simple type of downcomer having a slurry gas bubble removing means at it top disclosed in U.S. Pat. No. 5,382,748 the disclosure of which is incorporated herein by reference, is an example of means which can be modified to be useful as a downcomer reactor in the process of the invention.

The process comprises contacting hot slurry from the slurry body in the synthesis reactor with means for removing gas bubbles, and preferably gas bubbles and at least a portion of the particulate solids from the slurry liquid which densifies it, with the densified slurry and a hydrogen treat gas passed into the interior of the one or more downcomer reactors and then back into the surrounding slurry body. The hydroisomerization catalyst is located in the interior of the downcomer reactor and comprises the hydroisomerization reaction zone, in which the hydrogen reacts with the slurry hydrocarbon liquid to hydroisomerize at least a portion of it and produce a hydroisomerized liquid of reduced pour point. The hydroisomerized hydrocarbon liquid of reduced pour point then passes out of the downcomer and back into the surrounding slurry body in the synthesis reactor. This enables hydroisomerizing the slurry liquid (i) inside the synthesis reactor and (ii) while the synthesis reactor is producing hydrocarbons, but without interfering with the hydrocarbon synthesis reaction. The concentration of hydroisomerized hydrocarbon liquid in the synthesis reactor continues to increase until equilibrium conditions are reached. When the reactor reaches equilibrium it is possible for the slurry liquid being removed from it to comprise mostly hydroisomerized hydrocarbons of reduced pour point. In some cases, no further hydroisomerization of the liquid hydrocarbon product withdrawn from the synthesis reactor is necessary. Thus, the process of the invention will reduce and in some cases even eliminate the need for a separate, stand-alone hydroisomerization reactor and associated equipment downstream of the synthesis reactor. If a downstream hydroisomerization reactor is needed, it will be smaller than it would be if the synthesized hydrocarbon liquid passed into it was not at least partially hydroisomerized. While all of the hydroisomerized hydrocarbon liquid is typically returned back into the surrounding slurry body in the synthesis reactor with which it mixes, in some embodiments a portion of the hydroisomerized liquid may be passed from the downcomer reactor, out of the syntheses reactor to downstream operations.

The gas bubble and preferably the slurry gas bubble and particulate solids removal means is also located in the slurry body in the synthesis reactor and may comprise the same or separate means. While various filtration means may be used to separate the slurry liquid from at least a portion of the catalyst and any other particles, before the slurry is passed down into the hydroisomerization zone, in the practice of the invention the use of filtration means may be avoided by using known slurry solids reducing means that do not is employ filtration. Gas bubble and solids removal means suitable for use with the present invention are known and disclosed in, for example, U.S. Pat. Nos. 5,866,621 and 5,962,537, the disclosures of which are incorporated herein by reference. In addition to the '748 patent referred to above, simple gas bubble removing means are also disclosed in U.S. Pat. Nos. 5,811,468 and 5,817,702, the disclosures of which are also incorporated herein by reference. While gas bubble and solids removal means may or may not be part of the downcomer reactor, in these four patents the gas bubble and the gas bubble and solids removal means are immersed in the slurry body and comprise the slurry entrance at the top of the downcomer. As mentioned above, removing gas bubbles from the slurry densifies it and, if properly employed in connection with feeding it down into and through the downcomer reactor (e.g., the slurry is densified sufficiently above the external hydroisomerization zone), provides a density-difference driven hydraulic head to circulate the slurry from the slurry body in the synthesis reactor, down into and through the internal downcomer reactor and back into the surrounding slurry body. Removing gas bubbles from the slurry prior to hydroisomerization also reduces the CO and water vapor content of the flowing fluid, which could otherwise react with the hydroisomerization hydrogen and also adversely effect the hydroisomerization catalyst. A monolithic hydroisomerization catalyst having substantially vertical fluid flow channels and a minimal solid cross-sectional area perpendicular to the flow direction of the fluid minimizes the pressure drop of the fluid flowing down and across the catalyst surface. Removing catalyst and other solid particles, such as inert heat transfer particles, from the slurry upstream of the hydroisomerization zone, reduces scouring of the monolithic catalyst and plugging of the hydroisomerization reaction zone.

The invention comprises a slurry Fischer-Tropsch hydrocarbon syntheses process in which synthesized hydrocarbon slurry liquid is hydroisomerized in the synthesis reactor during hydrocarbon synthesis, by circulating slurry from the slurry body in the synthesis reactor down through a hydroisomerization zone in a downcomer reactor immersed in the slurry body, in which the slurry hydrocarbon liquid reacts with hydrogen in the presence of a hydroisomerization catalyst. Slurry circulation between the downcomer reactor and slurry body is achieved by the densification resulting from the gas bubble removal. At least a portion of the slurry liquid is hydroisomerized and this reduces its pour point. The hydroisomerized slurry leaves the downcomer reactor and all or most of it passes back into the surrounding slurry body with which it mixes. Preferably the hydroisomerization catalyst comprises a monolithic catalyst and at least a portion of both solids and gas bubbles are removed from the slurry before it contacts the hydroisomerization catalyst. More specifically the invention comprises a hydrocarbon synthesis process which includes hydroisomerizing hydrocarbon liquid produced by the synthesis reaction while the hydrocarbon liquid is being produced from a synthesis gas, the process comprising the steps of:

(a) passing a synthesis gas comprising a mixture of $H_2$ and CO into a slurry body comprising a three-phase slurry in a slurry Fischer-Tropsch hydrocarbon synthesis reactor, in which the slurry comprises gas bubbles and a particulate hydrocarbon synthesis catalyst in a slurry hydrocarbon liquid;

(b) reacting the $H_2$ and CO in the presence of the catalyst at reaction conditions effective to form hydrocarbons, a portion of which are liquid at the reaction conditions and comprise the slurry hydrocarbon liquid;

(c) contacting a portion of the slurry from the slurry body with means for removing gas bubbles, to form a densified slurry reduced in gas bubbles whose density is greater than that of the slurry comprising the slurry body in the synthesis reactor;

(d) passing a hydrogen treat gas and the densified slurry into a hydroisomerizing zone in one or more downcomer reactors immersed in the slurry body in the synthesis reactor, in which the hydrogen and hydrocarbon slurry liquid react in the presence of a preferably monolithic hydroisomerization catalyst to form a hydrocarbon liquid of reduced pour point, and (e) passing all or a portion of the pour point reduced liquid back into the surrounding slurry body.

While the liquid is being synthesized and hydroisomerized in the synthesis reactor, a portion is continuously or intermittently withdrawn and sent to downstream operations. It is preferred that at least a portion, and more preferably as much as possible of the particulate solids are removed from the slurry, before it is passed down into the hydroisomerizing zone.

DETAILED DESCRIPTION

Figure 1:
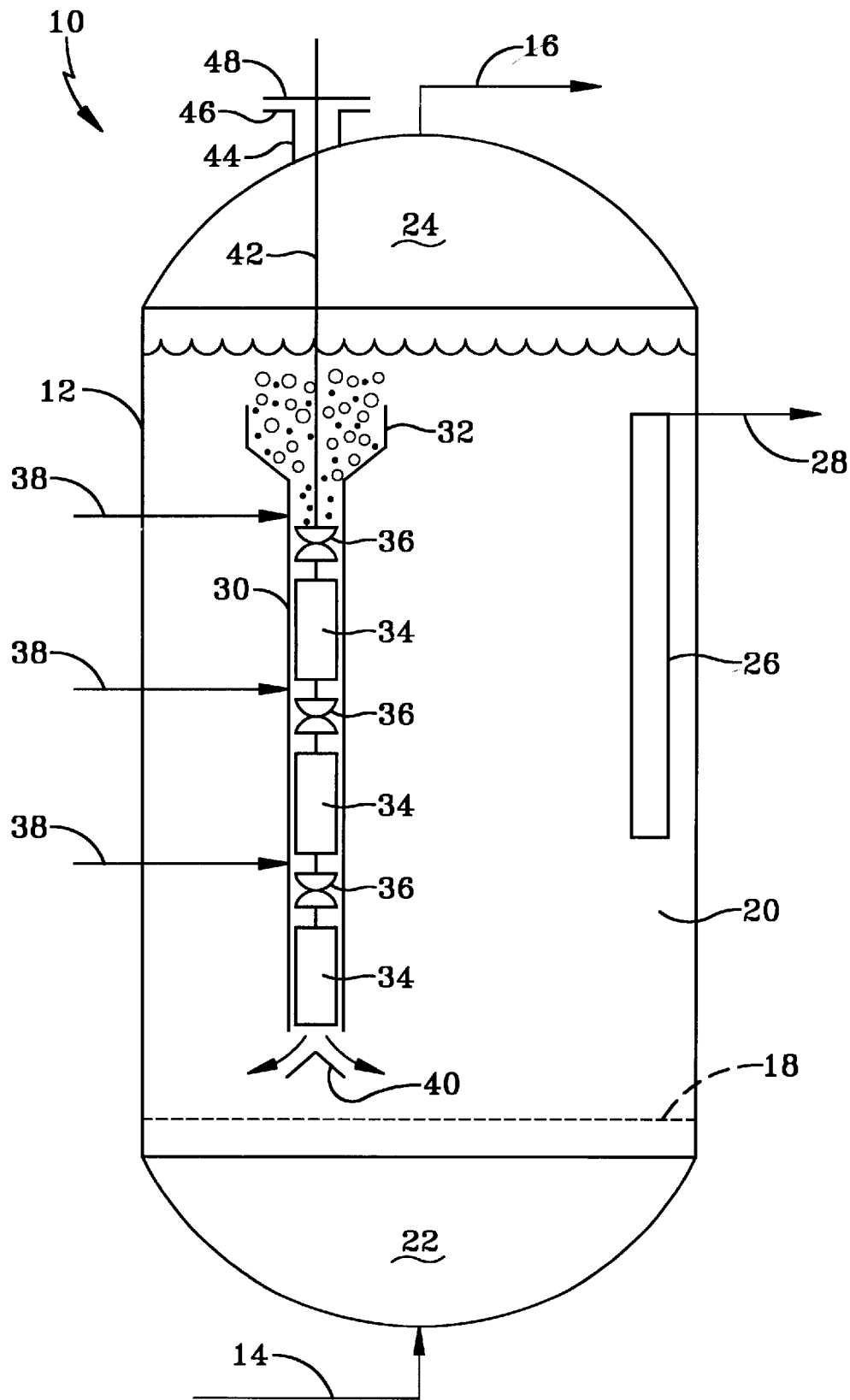
FIG. 1 is a simple schematic flow diagram of a hydrocarbon synthesis reactor containing a hydroisomerization zone within, according to one embodiment of the invention.

The waxy slurry liquid synthesized in the hydrocarbon synthesis reactor will typically comprise 500° F.+ hydrocarbons, with most having an initial boiling point in the 650–750° F.+ range. The end boiling point will be at least 850° F., preferably at least 1050° F. and even higher (1050° F.+). This liquid also comprises mostly (more than 50 wt. %), typically more than 90%, preferably more than 95% and more preferably more than 98 wt. % paraffinic hydrocarbons, most of which are normal paraffins, and this is what is meant by "paraffinic" in the context of the invention, particularly when the hydrocarbon synthesis catalyst comprises a cobalt catalytic component. The exact boiling range, hydrocarbon composition, etc, are determined by the catalyst and process variables used for the synthesis. It has negligible amounts of sulfur and nitrogen compounds (e.g., less than 1 wppm). Slurry liquids having these properties and useful in the process of the invention have been made using a slurry Fischer-Tropsch process with a catalyst having a catalytic cobalt component. In the practice of the invention, it is preferred that the slurry Fischer-Tropsch hydrocarbon synthesis catalyst comprise a catalytic cobalt or iron component. It is also preferred that the synthesis reaction have a Schulz-Flory alpha of at least 0.90, as higher molecular weight hydrocarbons are preferred in most cases. The gas bubbles in the slurry comprise synthesis gas, vapor and gaseous products of the synthesis reaction, such as $C_1$–$C_4$ hydrocarbons, and especially methane, $CO_2$ and water vapor. The hydroisomerization catalyst is adversely effected by water vapor. Therefore, in addition to densifying the slurry, gas bubble removal is also beneficial to the downstream hydroisomerizing catalyst. The flow rate of a gas bubble-reduced slurry down through a vertical downcomer can be substantial and a high flow rate is desired to offset the lift action of the hydrogen treat gas injected into the hydroisomerizing zone in the downcomer reactor. A high liquid flow rate prevents the hydrogen treat gas from pushing the downflowing slurry back up and out of the downcomer reactor, it also prevents the gas from rising up and out of the hydroisomerization zone, before hydroisomerization can take place. In an experiment with a 30 foot tall slurry hydrocarbon synthesis reactor, using a simple gas disengaging cup on top of a vertical downcomer pipe of the type disclosed in U.S. Pat. No. 5,382,748, resulted in a 12 ft/sec liquid flow rate down a 3 inch downcomer pipe, from which only half of the 60 vol. % of gas bubbles had been removed.

The hydroisomerization catalyst will have a both a hydrogenation/dehydrogenation function and an acid hydrocracking function for hydroisomerizing the normal paraffinic hydrocarbons in the slurry hydrocarbon liquid. The hydrocracking functionality of the catalyst results in the conversion of some of the waxy slurry liquid to lower boiling material. Since the hydroisomerization zone is in the hydrocarbon synthesis reactor, the hydroisomerization temperature and pressure will be substantially the same as that in the hydrocarbon synthesis reactor, unless means are employed to heat or cool the gas reduced slurry passing down the downcomer reactor. Thus, while hydroisomerization is broadly achieved at reaction temperatures ranging from 300–900° F. and preferably 550–750° F., the temperature in a slurry hydrocarbon synthesis reactor will typically range from 320–600° F. The pressure in the hydroisomerization zone will be substantially the same as that in the synthesis reactor, which is about 80–600 psig. However, U.S. Pat. No. 5,268,344, the disclosure of which is incorporated herein by reference, discloses means for adjusting the temperature in a vertical catalyst rejuvenation draft tube immersed in the slurry in a hydrocarbon synthesis reactor and these means may also be used to adjust the temperature in the interior of the downcomer reactor in the practice of the present invention. However, this will mean that the heat exchange means in the slurry synthesis reactor used to remove some of the exothermic heat of the synthesis reaction, will also have to remove the additional heat added in the hydroisomerization zones(s), in the case of heat addition into these zones to increase the hydroisomerization temperature above that of the synthesis temperature. This may not be feasible or desirable. The hydrogen treat gas rate will be from 500–5000 SCF/B, with a preferred range of 2000–4000 SCF/B. By hydrogen treat gas is meant all hydrogen or preferably at least about 60 vol. % hydrogen and an inert diluent gas, such as argon or methane. Excess hydrogen is employed during the hydroisomerization to insure an adequate hydrogen partial pressure and to prevent any CO remaining in the downflowing slurry from adversely effecting the hydroisomerization reaction and catalyst. The hydroisomerization catalyst comprises one or more Group VIII catalytic metal components supported on an acidic metal oxide support to give the catalyst both a hydrogenation function and an acid function for hydroisomerizing the hydrocarbons. At relatively lower hydroisomerizing temperatures, such as the temperature in the slurry hydrocarbon synthesis reactor, the catalytic metal component will typically comprise a Group VIII noble metal, such as Pt or Pd, and preferably Pt. However, if means are employed in the practice of the invention to raise the temperature in the hydroisomerization zone to sufficiently high levels, it will typically be preferred that the catalytic metal component comprise one or more less expensive non-noble Group VIII metals, such as Co, Ni and Fe, which will typically also include a Group VIB metal (e.g., Mo or W) oxide promoter. Irrespective of which Group VIII metal component is used, the catalyst may also have a Group IB metal, such as copper, as a hydrogenolysis suppressant. The Groups referred to herein refer to Groups as found in the Sargent-Welch Periodic Table of the Elements copyrighted in 1968 by the Sargent-Welch Scientific Company. The cracking and hydrogenating activity of the catalyst is determined by its specific composition, as is known. In a preferred embodiment the catalytically active metal comprises cobalt and molybdenum. The acidic oxide support or carrier may include silica, alumina, silica-alumina, silica-alumina-phosphates, titania, zirconia, vanadia, and other Group II, IV, V or VI oxides, as well as Y sieves, such as ultra stable Y sieves. Preferred supports include silica, alumina and silica-alumina and, more preferably silica-alumina in which the silica concentration in the bulk support (as opposed to surface silica) is less than about 50 wt. %, preferably less than 35 wt. % and more preferably 15–30 wt. %. As is known, if the support is alumina, small amounts of fluorine or chlorine are often be incorporated into it to increase the acid functionality. However, in the process of the invention, the use of halogens in the catalyst is to be avoided, to prevent impairing the hydrocarbon synthesis catalyst.

Hydroisomerization can be enhanced by using noble metal containing catalysts in at least one hydroisomerization zone within the downcomer reactor and non-noble metal containing catalysts in at least one other hydroisomerization zone within the downcomer reactor.

If temperatures higher than those in the synthesis reactor are employed in the downcomer reactor, a non-noble metal hydroisomerization catalyst that is particularly preferred in the practice of the invention comprises both cobalt and molybdenum catalytic components supported on an amorphous, low silica alumina-silica support, and most preferably one in which the cobalt component is deposited on the support and calcined before the molybdenum component is added. This catalyst will contain from 10–20 wt. % $MoO_3$ and 2–5 wt. % CoO on an amorphous alumina-silica support in which the silica content ranges from 20–30 wt. % of the support. This catalyst has been found to have good selectivity retention and resistance to deactivation by oxygenates typically found in Fischer-Tropsch produced waxy feeds. The addition of a copper component suppresses hydrogenolysis. The preparation of this catalyst is disclosed in, for example, U.S. Pat. Nos. 5,757,920 and 5,750,819, the disclosures of which are incorporated herein by reference.

Monolithic catalysts are known for automotive exhausts and for chemical reactions as is shown, for example, in an article by Crynes, et al., "Monolithic Froth Reactor: Development of a novel three-Phase Catalytic System", AIChE J, v. 41, n. 2, p. 337–345 (Febuary 1995). A corrugated type of monolithic catalyst has even been suggested for Fischer-Tropsch hydrocarbon synthesis (GB 2,322,633 A). Basically, monolithic catalysts comprise a ceramic or metal support structure of a desired shape, with a catalyst applied to its surface. The monolith may be a metal foam or may be prepared from the catalyst composition itself or from the catalyst support, e.g., molecular sieves, with the catalytic metal(s) deposited onto the monolith support. In this latter case, monolith attrition will still leave catalyst available for the hydroisomerization reaction. Preferred channel sizes for monoliths are in the range >300 μm and less than 600 μm.

Very high strength monolithic catalysts may be fabricated from a metal foundation, over which is applied a suitable ceramic and then the catalyst. The catalytic material may be a finished catalyst which has been ground to a small particle size, slurried in an appropriate liquid, such as water or an organic liquid, with the slurry then applied to the monolithic support surface as a wash coat and calcined. It is also possible to apply one or more applications of catalytic precursor materials to the ceramic support by impregnation or incipient wetness, followed by drying and calcining. In the practice of the invention, a monolithic catalyst having a minimal solid cross-sectional area perpendicular to the fluid flow direction is preferred, to minimize the pressure drop of the fluid flowing across the catalytic surface. Such catalysts will not be limited to containing substantially longitudinal and parallel fluid flow channels. However, since pressure drop across the catalyst is important, this must be taken into consideration. Micron size channel openings or openings on the order of a few microns will not be large enough for this application but openings generally exceeding 300 microns would be acceptable. Suitable catalyst shapes for providing a low pressure drop include an open cell foam structure, and configurations having a low cross-sectional area perpendicular to the fluid flow direction may also be used. Such shapes will include, for example, elongated star shapes, with and without an outer peripheral wall, corrugated constructions, with longitudinal channels parallel to the fluid flow direction, a honeycomb containing a plurality of open-ended flow channels substantially parallel to the fluid flow direction and the like. Many of these shapes may be extruded from a pre ceramic paste, dried and then fired to the green or fully fired to the final state, to provide the foundation for the catalyst material. Still further, all or some of the monolithic catalysts used in the hydroisomerization zone may be shaped in the form of a low pressure drop static mixer, such as a Kenics® static mixer in the form of slightly twisted or spiral-shaped metal strips. A monolithic catalyst having this shape may be prepared by applying a ceramic over a twisted metal strip and then applying or forming the catalyst on the ceramic. The advantage of this is to provide more intimate mixing of hydrogen and liquid and to prevent stratification of the gas and liquid flows as they flow down through the hydroisomerizing zone.

In the practice of the invention, the hydroisomerization zone in the downcomer reactor will preferably comprise a plurality of monoliths vertically arrayed on top of each other in the hydroisomerization zone. For example, in the case of a vertical, elongated and substantially vertical downcomer conduit, a plurality of cylindrical monoliths may be vertically arranged or arrayed along the vertical axis inside the downcomer conduit to form the hyroisomerization zone. The cross-sectional area of the catalyst monoliths perpendicular to the direction of fluid flow will typically proximate that of the interior of the conduit. It is preferred that there be vertical spaces between at least some of the monoliths, to prevent stratification of the gas and liquid as they flown down through the zone. More preferably, a low pressure drop static mixer, such as a Kenics® static mixer will be placed in the space between at least some of the arrays, to insure adequate mixing and remixing of the hydrogen treat gas and slurry liquid, as they flow down through the zone. As mentioned above, some or all of the catalyst monoliths themselves may be in the form of a low pressure drop static mixer, to insure good mixing and low pressure drop. It is preferred to inject the hydrogen or hydrogen treat gas into the hydroisomerization zone via a plurality of gas injection means, vertically spaced apart along the hydroisomerization zone. This will help to reduce the lifting action of the gas and stratification, as well as insuring good mixing of the downflowing fluid and the hydrogen. Still further, it is more preferred that the hydrogen be injected into such spaces upstream of one or more low pressure drop static mixers in the hydroisomerization zone, to mix the injected gas into the downflowing liquid at each gas injection point. The invention will be further understood with reference to FIG. 1.

Referring to FIG. 1, a slurry hydrocarbon synthesis reactor 10 is shown as comprising a cylindrical vessel 12 with a synthesis gas feed line 14 at the bottom and a gas product line 16 at the top. A synthesis gas comprising a mixture of $H_2$ and CO is introduced into the plenum space 22 at the bottom of the vessel via feed line 14, and then injected up through a gas injection means briefly illustrated by dashed line 18 and into the slurry body 20, which comprises bubbles of the uprising synthesis gas, and vapor and gas products of the synthesis reaction, along with solid particles of a Fischer-Tropsch catalyst in a hydrocarbon slurry liquid which comprises synthesized hydrocarbons that are liquid at the temperature and pressure in the reactor. Suitable gas injection means comprises a plurality of gas injectors horizontally arrayed across and extending through an otherwise gas and liquid impermeable, horizontal tray or plate, as is disclosed for example, in U.S. Pat. No. 5,908,094 the disclosure of which is incorporated herein by reference. The $H_2$ and CO in the slurry react in the presence of the particulate catalyst to form predominantly paraffinic hydrocarbons, most of which are liquid at the reaction conditions, particularly when the catalyst includes a catalytic cobalt component. Unreacted synthesis gas and gas products of the hydrocarbon synthesis reaction rise up and out the top of the slurry and into the gas collection space 24 in the top of the reactor, from where they are removed from the hydrocarbon synthesis reactor as tail gas via line 16. A filter means immersed in the slurry, which is simply indicated by box 26, separates the hydrocarbon liquids in the reactor from the catalyst particles and passes the synthesized and hydroisomerized hydrocarbon liquid out of the reactor via line 28. Filter 26 may be fabricated of sintered metal, wound wire and the like to separate the liquid product from the particulate solids in the slurry, and the slurry liquid removed via line 28 is typically sent to further processing or sold as a highly refined syncrude of reduced pour point. Not shown is means for overhead removal and replacement of the filter. Downcomer reactor 30 is shown as a vertical, hollow fluid conduit wholly immersed in the surrounding slurry body 20, with its open top and bottom opening into the surrounding slurry body. While only one such downcomer reactor is shown for convenience, a plurality of such reactors may be employed in the slurry body. The fluid entrance to downcomer 30 comprises a gas disengaging means 32, in the form of an upwardly opening cup which opens upward into the top of slurry body 20. This could be a simple gas bubble disengaging cup as is disclosed in U.S. Pat. No. 5,382,748. Means 32 is wholly immersed in the slurry body and is located in the upper portion of the slurry, to maximize the hydraulic head of the gas bubble reduced slurry entering into 30 and also because the catalyst concentration in the slurry body is typically lowest at the top. While only a is simple gas bubble removing means is illustrated for the sake of simplicity, it is preferred that both gas bubbles and particulate solids be removed from the slurry, before it passes down through 30. Simple gas, and preferably gas and solids disengaging means, such as those disclosed in the '621 and '537 patents referred to above are preferred to means such as conventional filters, magnetic or centrifugal solids separating means, because they do not require pumps or expensive equipment. They also provide a density-difference hydraulic head by virtue of densifying the slurry due to gas bubble removal, to circulate the slurry from the top of the surrounding slurry body down into and out of the bottom of the downcomer reactor. The gas reduced and preferably the gas and solids reduced slurry formed in 32 passes down through the interior of downcomer reactor 30, in which it mixes and reacts with hydrogen in the presence of a series of monolithic hydroisomerizing catalyst sections 34, which define the hydroisomerization zone in the interior of downcomer reactor. The hydrogen or hydrogen treat gas is injected into the interior of the downcomer reactor, via multiple hydrogen treat gas injection lines 38, just upstream of each successive downstream catalyst section. Typically and preferably, the hydroisomerization zone comprises a plurality of monolithic catalyst sections or zones, shown as three in the Figure for the sake of illustration. Each section 34 comprises one or more discrete monolithic catalyst bodies vertically stacked above each other, with each section vertically spaced apart to permit the hydroisomerization hydrogen gas injected upstream of each stage, to mix with the downflowing liquid prior to contact with the downstream catalyst section. Multiple injection of the hydrogen treat gas provides mixing of the hydrogen with the downflowing liquid, before each of the three hydroisomerization stages shown, reduces gas/liquid stratification and also reduces the lifting effect of the injected gas, which tends to oppose the hydraulic downflow circulation of the slurry through 30, to be significantly less than it would otherwise be if all of the hydrogen was injected into the downcomer at one point. During the hydroisomerization, a portion of the hydrogen is consumed. Thus, multiple hydrogen injection points vertically spaced apart along the vertical axis of the hydroisomerization zone minimize the lifting effect of the gas and provide more efficient gas/liquid mixing. Also shown in FIG. 1 is a low pressure drop static mixer 36, such as Kenics® static mixers comprising twisted strips of sheet metal, located in the vertical space between each catalyst section. One or more such static mixers is located downstream of each hydrogen injection point and upstream of the next, successive catalyst section to mix and remix the hydrogen gas with the downflowing slurry before it enters the next catalyst section. A simple baffle 40 is located vertically under the slurry exit of 30 as shown, to prevent uprising bubbles of synthesis gas from entering up into the downflow reactor. It also imparts a horizontal flow component to the downflowing slurry, as indicated by the two arrows, to provide better mixing of the hydroisomerized slurry with the surrounding slurry body. The extent of the hydrocarbon liquid hydroisomerization per pass through the loop, will vary with the type of catalyst, the amount of catalytic surface area, reaction conditions, hydrogen gas and hydrocarbon liquid flow rate, the amount of residual water and CO, if any, remaining in the liquid, the concentration of normal paraffinic components in the hydrocarbon liquid, etc. The hydrocarbon liquid flowing out of the hydroisomerization reaction zone comprises a mixture of normal paraffins and hydroisomerized components of reduced pour point. If desired, a portion of the downflowing hydroisomerized slurry may be removed from 30 by means not shown and passed out of the synthesis reactor to downstream facilities and processing. Also shown in this embodiment is a catalyst support rod 42, connected to the monolithic catalyst sections and static mixers in the hydroisomerizing zone in the downcomer 30. This permits the monolithic catalyst bodies and static mixers to be removed for replacement and maintenance through a port or conduit 44, at the top of the synthesis reactor 10. A removable plate 48 is detachably attached to 44 via bolts (not shown) that go through flange 46.

It is known that in a Fischer-Tropsch hydrocarbon synthesis process, liquid and gaseous hydrocarbon products are formed by contacting a synthesis gas comprising a mixture of $H_2$ and CO with a Fischer-Tropsch catalyst, in which the $H_2$ and CO react to form hydrocarbons under shifting or non-shifting conditions and preferably under non-shifting conditions in which little or no water gas shift reaction occurs, particularly when the catalytic metal comprises Co, Ru or mixture thereof. Suitable Fischer-Tropsch reaction types of catalyst comprise, for example, one or more Group VIII catalytic metals such as Fe, Ni, Co and Ru. In one embodiment the catalyst comprises catalytically effective amounts of Co and one or more of Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674. Fixed bed, fluid bed and slurry hydrocarbon synthesis processes are well known and documented in the literature. In all of these processes the synthesis gas is reacted in the presence of a suitable Fischer-Tropsch type of hydrocarbon synthesis catalyst, at reaction conditions effective to form hydrocarbons. Some of these hydrocarbons will be liquid, some solid (e.g., wax) and some gas at standard room temperature conditions of temperature and pressure of 25° C. and one atmosphere, particularly if a catalyst having a catalytic cobalt component is used. Slurry Fischer-Tropsch hydrocarbon synthesis processes are often preferred because they are able to produce relatively high molecular weight, paraffinic hydrocarbons when using a cobalt catalyst. In a slurry hydrocarbon synthesis process, which is a preferred process in the practice of the invention and preferably one that is conducted under nonshifting conditions, a synthesis gas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. The stoichiometric mole ratio for a Fischer-Tropsch reaction is 2.0, but in the practice of the present invention it may be increased to obtain the amount of hydrogen desired from the synthesis gas for other than the hydrocarbon synthesis reaction. In the slurry process, the mole ratio of the $H_2$ to CO is typically about 2.1/1. Slurry hydrocarbon synthesis process conditions vary somewhat depending on the catalyst and desired products. Typical conditions effective to form hydrocarbons comprising mostly $C_{5+}$ paraffins, (e.g., $C_{5+}$–$C_{200}$) and preferably $C_{10+}$ paraffins in a slurry process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (60° F., 1 atm) per hour per volume of catalyst, respectively.

The hydrocarbons which are liquid at the synthesis reaction conditions and which comprise the slurry liquid which is hydroisomerized by the practice of the invention, are typically fractionated, with one or more of the resulting fractions receiving one or more additional conversion operations. By conversion is meant one or more operations in which the molecular structure of at least a portion of the hydrocarbon is changed and includes both noncatalytic processing (e.g., steam cracking), and catalytic processing in which a fraction is contacted with a suitable catalyst, with or without the presence of hydrogen or other coreactants. If hydrogen is present as a reactant, such process steps are typically referred to as hydroconversion and include, for example, further hydroisomerization, hydrocracking, hydrorefining and the more severe hydrorefining referred to as hydrotreating. Illustrative, but nonlimiting examples of suitable products formed by upgrading include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

The invention will be further understood with reference to the Examples below.

EXAMPLES

Example 1

Four bifunctional monolithic hydroisomerization catalysts, each consisting of an acidic cracking component and a hydrogenation/dehydrogenation metal component, were prepared using cylindrically shaped and commercially available, open cell alpha alumina foam as the monolith support. The alumina foam cylinders were each 0.5 inches in diameter and 1 inch long. Two different cell sizes were used, one having 20 pores per inch (ppi) and the other having 65 ppi. The average pore sizes were about 1000 $\mu$m and 300 $\mu$m. Two different zeolites were used as the acidic components, to make two different hydroisomerization catalysts. These zeolites were LZY-82 and zeolite beta. Each zeolite was first impregnated with 0.5 wt. % Pt using standard incipient wetness techniques, dried, and calcined at 400° C. for 4 hours. The zeolite materials were slurried in water/acetic acid (5%) and then applied onto the alpha alumina foam as washcoats using multiple dips followed by calcination (600° C. for 2 hours). The four finished monolithic catalysts are summarized in Table 1.

TABLE 1

| Catalyst Description | Monolith Volume in.$^3$ | Average Loading in.$^3$ |
| --- | --- | --- |
| Pt/beta (20 ppi) | 0.196 | 1.82 |
| Pt/beta (65 ppi) | 0.196 | 1.78 |
| Pt/LZY-82 (20 ppi) | 0.196 | 1.35 |
| Pt/LZY-82 (65 ppi) | 0.196 | 1.67 |

Example 2

These four catalysts were evaluated for their hydroconversion effectiveness for heavy, waxy, paraffinic hydrocarbons using hexadecane (n-$C_{16}H_{38}$) as a representative feed for a Fischer-Tropsch synthesized hydrocarbon liquid. The hydroconversion runs were carried out in a small, up-flow pilot plant running at a hydrogen pressure and nominal treat rate of 750 psig and 2500 SCF/B with weight hourly space velocity (WHSV) ranging from 2.3 to 3.1. The degree of conversion was varied by adjusting the temperature from 400–550° F. Each reactor was charged with 5 of the cylindrical catalytic monoliths in series with alpha alumina foams of similar ppi rating used at the front and back of the reaction zone. The reactor conditions for each run are summarized in Table 2.

TABLE 2

| Feedstock | Hexadecane | Hexadecane | Hexadecane | Hexadecane |
| --- | --- | --- | --- | --- |
| Catalyst Description | 0.5 wt. % Pt/Beta (20 ppi) | 0.5 wt. % Pt/Beta (65 ppi) | 0.5 wt. % Pt/LZY (20 ppi) | 0.5 wt. % Pt/LZY (20 ppi) |
| Conditions | | | | |
| WHSV, g/hr/g | 2.3 | 2.4 | 3.1 | 2.5 |
| Temp., ° F. | | | 400–500 | |
| H$_2$ rate, SCF | | | 2500 | |
| Feed, grs/hr | | | 4.1 | |

Figure 2:
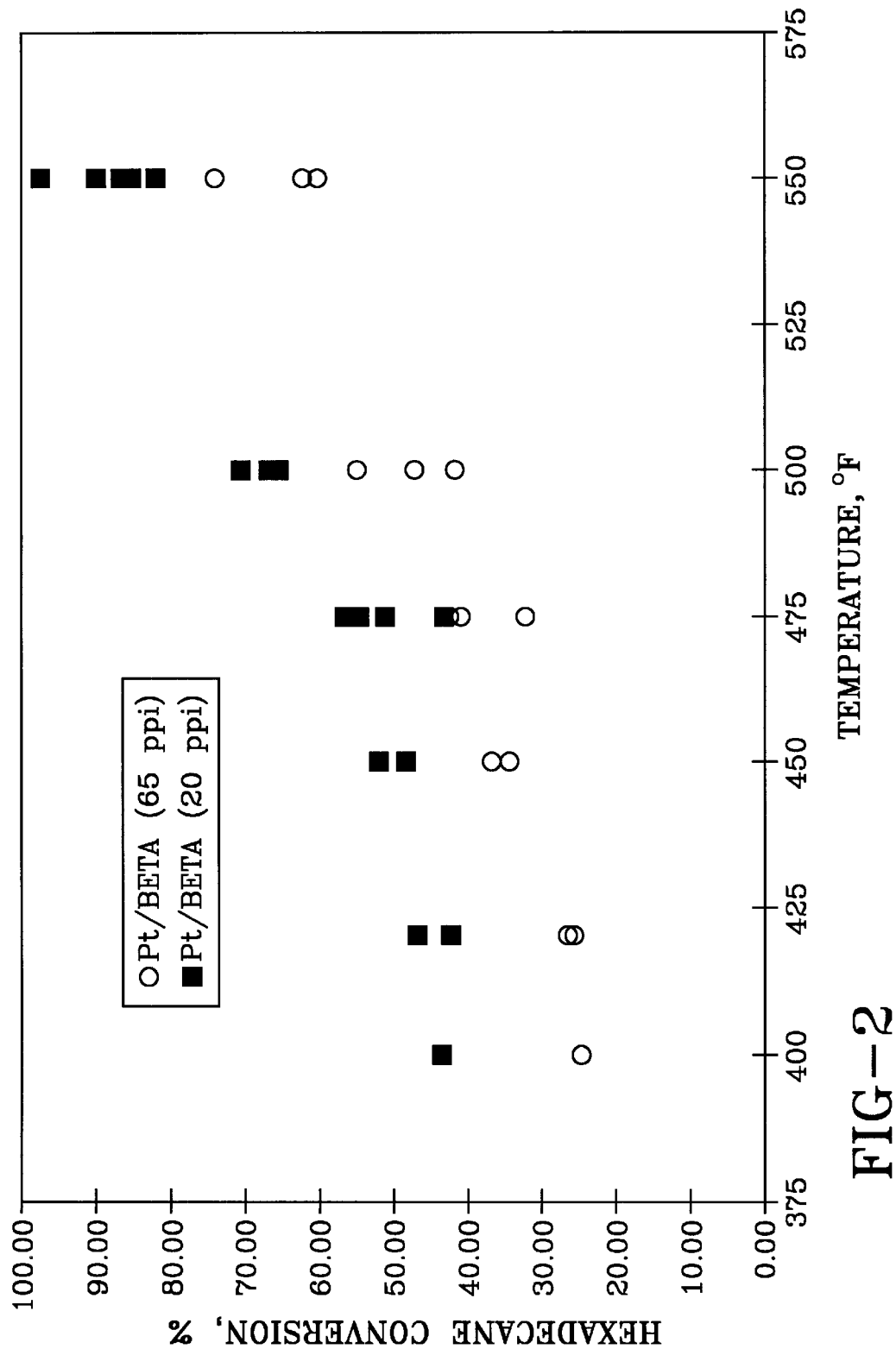
FIG. 2 is a plot of hexadecane conversion as a function of temperature in the presence of a monolithic hydroisomerization catalyst in a pilot plant tubular reactor.
Figure 3:
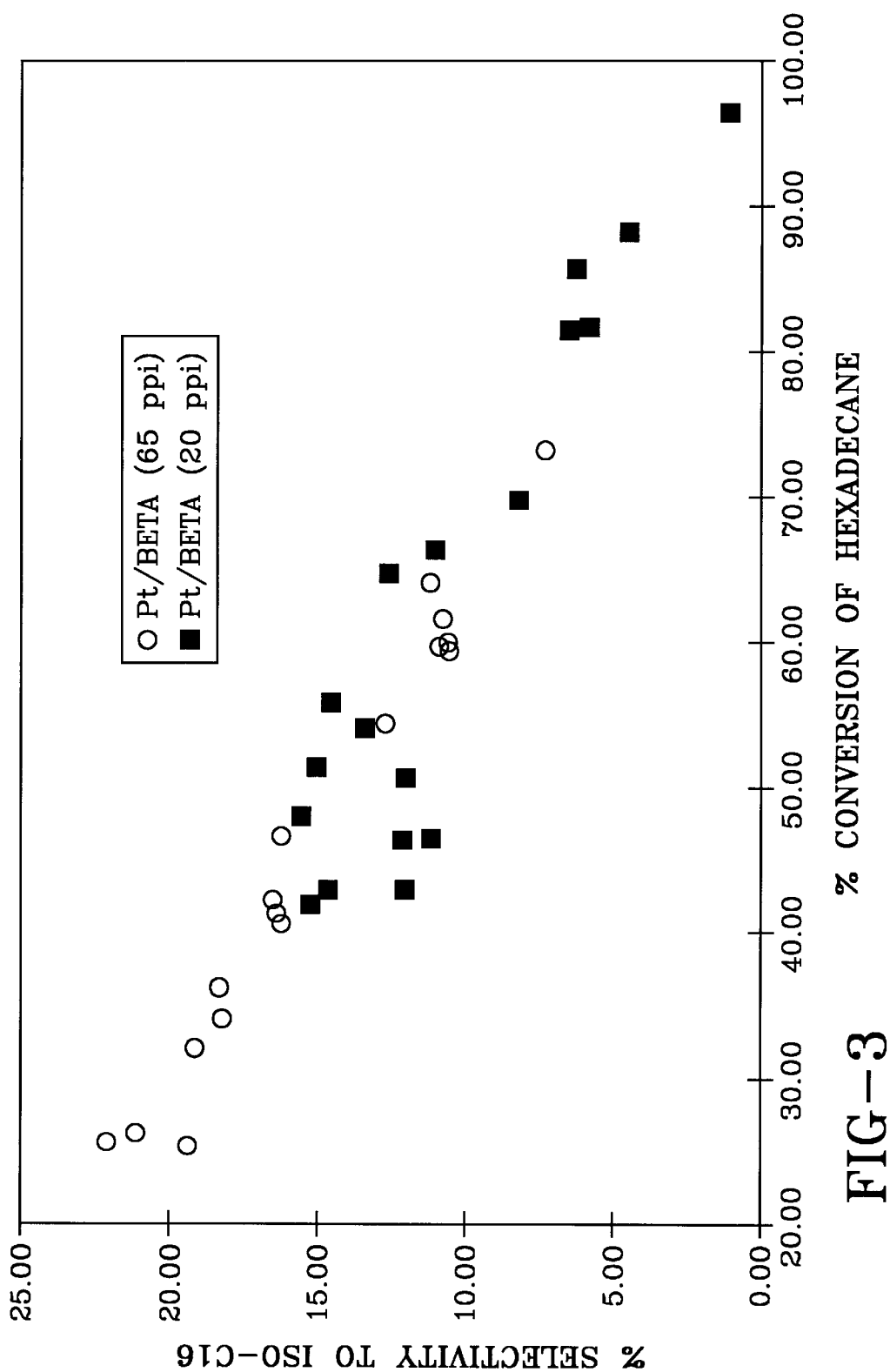
FIG. 3 is a graph illustrating hexadecane hydroisomerization selectivity over a monolithic hydroisomerization catalyst in a pilot plant tubular reactor.

The results of the runs are shown in FIGS. 2 and 3. FIG. 2 is a plot of hexadecane conversion as a function of temperature, using the Pt/Beta catalysts. FIG. 3 is a plot of the selectivity of the hexadecane conversion to $C_{16}$ isoparaffins, determined by gas chromatography, as a function of the reactor temperature for the Pt/Beta catalysts. The results for the Pt/LZY-82 catalysts are not shown, because this catalyst was essentially inactive, even at the relatively high temperature of 550° F. The results for the Pt/Beta catalysts shown in FIG. 3 clearly demonstrate the conversion of the hexadecane to isoparaffin. While the cracking activity of the catalysts was greater than desired, the results nevertheless demonstrate the efficacy of hydroisomerizing n-paraffins to isoparaffins, using a monolithic hydroisomerization catalyst.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for hydroisomerizing the slurry hydrocarbon liquid produced in a slurry hydrocarbon synthesis reactor in said reactor while it is producing said liquid from a synthesis gas and wherein said slurry in said synthesis reactor comprises gas bubbles and catalyst particles in said liquid, said process comprising:

(a) contacting a portion of said slurry with means for removing gas bubbles, to produce a gas bubble reduced slurry having a density greater than that of said slurry in said synthesis reactor;

(b) passing a hydrogen treat gas and said densified, gas bubble reduced slurry into and down through a hydroisomerization zone in one or more downcomer reactors immersed in, in fluid communication with and surrounded by said slurry in said synthesis reactor, each said downcomer reactor containing a hydroisomerization catalyst therein which defines a hydroisomerization zone;

(c) reacting said gas bubble reduced slurry and hydrogen in the presence of said hydroisomerization catalyst, at reaction conditions effective to hydroisomerize at least a portion of said liquid and produce a hydroisomerized liquid, and (d) passing all or a portion of said hydroisomerized hydrocarbon liquid back into said surrounding slurry and thereby forming part of said slurry liquid.

2. A process according to claim 1 wherein there is more than one downcomer reactor.

3. A process according to claim 2 wherein at least one downcomer contains noble metal containing hydroisomerization catalyst and wherein at least one other downcomer contains non-noble metal hydroisomerization catalyst.

4. A process according to claim 1 wherein circulation of said gas bubble reduced slurry down through said downcomer reactor and back into said surrounding slurry in said synthesis reactor is produced at least in part by density-driven hydraulics due to said slurry density differences.

5. A process a cording to claim 4 wherein said slurry hydrocarbon liquid is intermittently or continuously withdrawn as product liquid from said synthesis reactor, while it is producing said hydrocarbon slurry liquid.

6. A process according to claim 5 wherein, in addition to gas bubble removal, at least a portion of said catalyst particles are also removed from said slurry before it is passed down into said hydroisomerization zone.

7. A process according to claim 6 wherein said hydroisomerization catalyst comprises a monolithic catalyst.

8. A process according to claim 7 wherein said hydroisomerization catalyst is in the form of a monolith.

9. A process according to claim 7 wherein said monolithic catalyst comprises a plurality of monolithic catalyst bodies vertically arrayed in said zone.

10. A process according to claim 9 wherein at least a portion of said slurry liquid removed from said synthesis reactor is passed to at least one upgrading operation comprising at least fractionation and/or one or more conversion operations.

11. A process according to claim 10 wherein said gas bubble removal means is immersed in said slurry in said synthesis reactor.

12. A process according to claim 11 wherein at least a portion of said monolithic bodies are vertically spaced apart in said hydroisomerization zone.

13. A process according to claim 12 wherein said hydrogen treat gas is passed into said zone through at least two separate gas injection means vertically spaced apart along said zone, each upstream of a monolithic catalyst body.

14. A process according to claim 13 wherein a static mixing means is located in at least a portion of said spaces between said monolithic bodies.

15. A process according to claim 14 wherein at least a portion of said hydrogen is injected into said hydroisomerization zone upstream of at least one of said mixing means.

16. A process according to claim 5 wherein said gas bubbles and particulate solids are removed from said slurry by gas bubble and solids removing means immersed in said slurry in said synthesis reactor.

17. A process according to claim 16 wherein said gas bubbles and particulate solids are removed from said slurry liquid upstream of said hydroisomerizing zone by density difference.

18. A process according to claim 16 wherein said gas bubble removing means is located proximate the slurry entrance of said downcomer reactor.

19. A slurry hydrocarbon synthesis process which includes hydroisomerizing hydrocarbon liquid produced in a slurry hydrocarbon synthesis reactor in one or more downcomer reactors in said synthesis reactor while it is producing said liquid from a synthesis gas and wherein said slurry in said synthesis reactor comprises gas bubbles and catalyst particles in said liquid, said process comprising:

(a) passing said synthesis gas comprising a mixture of $H_2$ and CO into a slurry body in a slurry Fischer-Tropsch hydrocarbon synthesis reactor, in which said slurry body comprises gas bubbles and a particulate hydrocarbon synthesis catalyst in a slurry hydrocarbon liquid;

(b) reacting said $H_2$ and CO in the presence of said catalyst at reaction conditions effective to form hydrocarbons, a portion of which are liquid at said reaction conditions and comprise said slurry liquid;

(c) contacting a portion of said slurry from said slurry body with means for removing gas bubbles, to form a gas bubble reduced slurry densified to a density greater than that of said slurry comprising said slurry body;

(d) passing a hydrogen treat gas and said densified slurry into and down through a hydroisomerization zone in said one or more downcomer reactors in which they react in the presence of a monolithic hydroisomerization catalyst to form a hydroisomerized hydrocarbon liquid of reduced pour point, wherein said one or more downcomer reactors are immersed in said slurry body and wherein said densified slurry passes down through said one or more downcomer reactors, at least in part by density-driven hydraulics due to said slurry density difference, and (e) passing at least a portion of said hydroisomerized hydrocarbon liquid back into said surrounding slurry body with which it mixes.

20. A process according to claim 19 wherein said slurry hydrocarbon liquid is intermittently or continuously withdrawn as product liquid from said synthesis reactor, while it is producing said hydrocarbon slurry liquid and wherein at least a portion of said product liquid is passed to at least one upgrading operation comprising at least fractionation and/or one or more conversion operations.

21. A process according to claim 20 wherein said gas bubble reducing means is at least partly immersed in said slurry body.

22. A process according to claim 21 wherein said monolithic hydroisomerization catalyst comprises a plurality of vertically arrayed monolithic catalyst bodies, at least a portion of which are vertically spaced apart.

23. A process according to claim 22 wherein said hydrogen treat gas is passed into said zone by at least two separate gas injection means vertically spaced apart along said zone, each upstream of a monolithic catalyst body.

24. A process according to claim 23 wherein solid particles are also removed from said slurry, before said slurry liquid contacts said hydroisomerization catalyst and wherein said gas bubbles and particulate solids are removed from said slurry by gas bubble and solids removing means at least partially immersed in said slurry body.

25. A process according to claim 24 wherein a static mixing means is located in at least a portion of said spaces between said catalyst bodies.

* * * * *